United States Patent
Heinrichs

(10) Patent No.: US 6,391,189 B1
(45) Date of Patent: May 21, 2002

(54) WAX BLEND FOR AQUEOUS APPLICATIONS

(75) Inventor: Franz-Leo Heinrichs, Gablingen (DE)

(73) Assignee: Clariant GmbH, Frankfurt (DE)

( * ) Notice: Subject to any disclaimer, the term of this patent is extended or adjusted under 35 U.S.C. 154(b) by 0 days.

(21) Appl. No.: 09/658,308

(22) Filed: Sep. 8, 2000

(30) Foreign Application Priority Data

Sep. 9, 1999 (DE) .......................... 199 42 962

(51) Int. Cl.[7] .............................. C08L 91/00; C14C 9/00
(52) U.S. Cl. ...................... 208/21; 252/8.57; 508/450; 508/451
(58) Field of Search ..................... 252/8.57; 208/21

(56) References Cited

U.S. PATENT DOCUMENTS

| | | | | |
|---|---|---|---|---|
| 3,619,266 A | * | 11/1971 | Weissermel et al. | 524/114 |
| 3,854,962 A | * | 12/1974 | Speyer | 106/38.7 |
| 4,554,083 A | * | 11/1985 | Soldanski et al. | 252/8.57 |
| 4,976,888 A | * | 12/1990 | DeClerq et al. | 252/358 |
| 5,164,436 A | * | 11/1992 | Maier et al. | 524/290 |
| 5,437,722 A | * | 8/1995 | Borenstein | 106/778 |
| 5,695,553 A | * | 12/1997 | Claret et al. | 106/778 |

* cited by examiner

*Primary Examiner*—Ellen M. McAvoy
(74) *Attorney, Agent, or Firm*—Anthony A. Bisulca

(57) ABSTRACT

The present specification relates to wax blends comprising partial esters of polyols and montan wax acid, hydrocarbon wax, long-chain carboxylic acids and long-chain alcohols and to their use. With such blends it is possible, without water-soluble emulsifier and permanent soaps, to produce aqueous pastes which can be applied in use to leather surfaces to give water-resistant, non-tacky, elastic films without gray break. The drying times are shorter than with the known formulations, and the dried coat applied can easily be polished to highly glossy films.

23 Claims, No Drawings

WAX BLEND FOR AQUEOUS APPLICATIONS

BACKGROUND OF THE INVENTION

The present specification relates to wax blends comprising partial esters of polyols and montan wax acid and derivatives thereof, long-chain carboxylic acids and long-chain alcohols and to their use.

Mixtures of polar waxes, hydrocarbon waxes, soaps and paraffins are used as paste-forming waxes in petroleum-spirit solvents to produce shoe polishes. The solids content of these compositions is about 25–30% by weight; i.e., on application, from 70 to 75% by weight of the formulation passes into the environment in the form of the volatile solvent component. In order to reduce these emissions there is a need for aqueous formulations. With a view to consumer familiarity, these formulations ought not to bring any disadvantages in use and should be capable of being used, as hitherto, in the form of a paste in tins.

Water-based formulations include high proportions of emulsifiers, e.g., ethoxylated alcohols, short-chain alcohols or soaps, so that the wax components can be emulsified in the water. On application, this leads to soft films or films which are not resistant to water. Other recipes combine the waxes with polymer dispersions in order to enhance the hardness and water resistance of the film, but in this case a permanent film buildup is observed on the polished surface, which breaks over time and gives the surface a gray shade.

SUMMARY OF THE INVENTION

The object was therefore to provide wax blends which do not have the abovementioned disadvantages.

Surprisingly, a wax blend has now been found which may be processed without water-soluble emulsifier and permanent soaps to produce aqueous pastes and which can be applied in use to leather surfaces to give water-resistant, nontacky, elastic films without gray break. The drying times are shorter than with the known formulations, and the dried coat applied can easily be polished to highly glossy films.

DESCRIPTION OF THE PREFERRED EMBODIMENTS

The present invention therefore provides a wax blend comprising 10–80% by weight of an ester component A, 10–80% by weight of an acid component B, and 10–80% by weight of an alcohol component C.

As the ester component A, the wax blend of the invention comprises synthetic partial esters of polyhydric alcohols and long-chain carboxylic acids and/or derivatives thereof such as polyesters and urethanes thereof, and/or natural waxes having a correspondingly high OHN (hydroxyl number) such as, for example, carnauba wax; as acid component B it comprises long-chain wax acids such as montan wax acid or $C_{32/36}$ guerbet acid; and as the alcohol component C it comprises long-chain alcohols having a chain length $>C_{18}$ such as Uniline alcohols from Petrolite.

Acid components for preparing the ester component A may be the following: montan wax acid, oxidates of long-chain olefins or paraffins and/or guerbet acid $C_{32-36}$ in combination with long-chain fatty acids.

Alcohol components for preparing the ester component A may be the following: trimethylolpropane, pentaerythritol, dipentaerythritol, glycerol, diglycerol, sorbitol and sorbitan, N-alkylglucamines and dialkanolamines.

Individually, the ester component A consists of partial esters of polyols with carboxylic acids and carboxylic acid mixtures of chain length $C_{16-36}$; partial esters of polyols with carboxylic acids and carboxylic acid mixtures of chain length $C_{16-36}$, modified with polybasic carboxylic acids of chain length $C_{4-36}$; partial esters of polyols with carboxylic acids and carboxylic acid mixtures of chain length $C_{16-36}$, modified with aromatic or aliphatic diisocyanates; partial esters of polyols with carboxylic acids and carboxylic acid mixtures of chain length $C_{16-36}$, modified with aromatic or aliphatic carboxylic acids of low molecular mass, or of any desired mixtures of the abovementioned substances; and also, if desired, additionally of natural waxes having an OHN>20.

Preference is given to wax blends in which the number of OH groups in the alcohol component of the partial esters of the ester component A is >=2, with the exception of 1,2-ethanediol and 1,3-butanediol. It is possible to use polyhydric primary alcohols, such as, for example, trimethylolpropane, pentaerythritol, their dimers or oligomers, and/or their ethoxylation products.

In the partial esters of the ester component A the degree of esterification is <90%, preferably between 50 and 75%.

For modifying the partial esters of the ester component A with polybasic carboxylic acids it is usual to use tribasic and dibasic carboxylic acids, especially citric acid, tartaric acid, malic acid, itaconic acid, maleic acid, adipic acid, sebacic acid, dodecanedioic acid, dimeric fatty acid, phthalic acid and terephthalic acid. For modification with isocyanates it is common to use monofunctional and difunctional aromatic and/or aliphatic isocyanates.

In particular, for modifying the partial esters of the ester component A with short-chain carboxylic acids, it is usual to use saturated, unsaturated, hydroxy-functional fatty acids, aromatic carboxylic acids such as hydroxybenzoic acid, hydroxymethylbenzoic acid, and phenylacetic acid.

The acid component B consists mostly of montan wax acid, or of oxidates of long-chain olefins or paraffins, or of dimerization products of long-chain fatty compounds such as dimeric fatty acid or guerbet acid, or of mixtures of these abovementioned substances, or of mixtures of one or more of the abovementioned substances with one or more fatty acids.

The alcohol component C consists mostly of long-chain wax alcohols of chain length $>C_{30}$ or of guerbet alcohol of chain length $>C_{30}$ or of wool wax alcohol and other stearols, or of any desired mixtures of the abovementioned substances, or of mixtures of one or more of the abovementioned substances with one or more fatty alcohols.

The wax blend of the invention may be used in combination with other wax-like compounds, such as, for example, hydrocarbon waxes and/or natural waxes and/or polymer dispersions and known formulation auxiliaries for preparing aqueous pastes for leather care.

A W/O emulsion is prepared from this wax blend with the addition of small amounts of a compatibilizer and a base, preferably an amine. To improve the keeping properties, a preservative, e.g., Mergal K9, and a humidity regulator such as sorbitol or glycerol may be added.

To optimize the hardness of the paste and the film hardness it is possible to carry out blending with known formulation components.

EXAMPLES

Comparative Examples

Formulations

The amounts in the tables are to be understood as parts by weight.

Comparative Example 1

Solvent preparation

| | | |
|---|---|---|
| Wax O | 9.00 | Wax and solvent are heated, |
| Wax E | 3.00 | the clear solution is cooled to casting |
| Wax LP | 1.80 | temperature of 55–60° C., the |
| Wax PE 520 | 1.80 | solution is cast into tins and cooled |
| Microwax | 1.80 | in a thermal conditioning cabinet. |
| Fully refined wax | 9.00 | High paste hardness, good gloss, stable |
| Ca stearate | 1.50 | films, mature technology, but with |
| White spirit | 72.10 | high solvent loss. |
| | 100.00 | |

Comparative Example 2

Aqueous with alcohol and polymer dispersion

| | | |
|---|---|---|
| Wax emulsion, 40% | 46.00 | O/W system. The components are |
| Resin | 6.00 | 20.00 mixed hot, isopropanol is added |
| Isopropanol | 20.00 | for homogenization, |
| Na silicate | 0.30 | cooling produces a solid gel. Films |
| Mowilith | 5.00 | with dry-bright effect, but alteration |
| Licomer W 11 | 1.50 | of the original surface polymer |
| Water | 15.00 | film buildup |
| | 87.80 | |

Comparative Example 3

Aqueous with emulsifier

| | | |
|---|---|---|
| Wax S | 10.00 | O/W system, wax to water, |
| Paraffin | 10.00 | water to wax process, gives |
| Resin | 2.00 | O/W emulsion, which gels and is filled into |
| Genapol T 110 | 2.00 | tubes or as pastes. |
| KOH | 1.00 | |
| Water | 75.00 | |
| | 100.00 | |

Comparative Example 4

Aqueous with fatty components

| | | |
|---|---|---|
| TMP montan ester | 10.00 | W/O system; first introduce fatty phase |
| Tallow fatty acid | 6.00 | (100° C.), add a little water with the base |
| Fully refined wax | 10.00 | (90° C.), add the remaining water, |
| Fatty alcohol | 6.00 | stir cold and cast at 76° C.; |
| KOH | 1.00 | a tacky film with a long drying time |
| Sorbitol | 2.00 | is obtained. |
| Water | 165.00 | |
| | 200.00 | |

FORMULATIONS OF THE INVENTION

Example 1

General Formulation

| | |
|---|---|
| Wax blend | 20.00 |
| Fully refined wax | 10.00 |
| Base | 1.00 |
| Humectant | 2.00 |
| Water | 165.00 |
| | 200.00 |

Composition of the Wax Blend

| | |
|---|---|
| TMP complex ester | 45.4% by weight |
| Montanic acid | 27.3% by weight |
| Wax alcohol Uniline 425 | 27.3% by weight |

Overview of Composition of the Montan Esters

| Alcohol component | Degree of esterification, % | Additions |
|---|---|---|
| Trimethylolpropane | 60–90 | none |
| | 60 | dicarboxylic acid |
| | 60 | diisocyanate |
| Pentaerythritol | 65–75 | none |
| | 75 | dicarboxylic acid |
| | | phenylacetic acid |
| | | diisocyanate |
| Diglycerol | 50–65 | none |
| Sorbitol | 15–45 | none |
| N-methyl glucamine | 30 | none |
| Diethanolamine | 66 | none |
| | | phenyl acetic acid |

Example 2

| | |
|---|---|
| Wax blend | 22.00 |
| Fully refined wax 52–54 | 10.00 |
| Diethylenetriamine | 1.00 |
| N-methylglucamine | 2.00 |
| Water | 165.00 |
| | 200.00 |

Example 3

| | |
|---|---|
| Wax blend | 22.00 |
| Fully refined wax 52–54 | 10.00 |
| Diethylenetriamine | 1.00 |
| Sorbitol | 2.00 |
| Water | 165.00 |
| | 200.00 |

Example 4

| | |
|---|---:|
| Wax blend | 22.00 |
| Fully refined wax 60–62 | 10.00 |
| Diethylenetriamine | 1.00 |
| N-methylglucamine | 2.00 |
| Water | 165.00 |
| | 200.00 |

Example 5

| | |
|---|---:|
| Wax blend | 22.00 |
| Fully refined wax 52–54 | 10.00 |
| Diethylenetriamine | 1.00 |
| Diglycerine | 2.00 |
| Water | 165.00 |
| | 200.00 |

Example 6

| | |
|---|---:|
| Wax blend | 22.00 |
| Fully refined wax 52–54 | 10.00 |
| Diethylenetriamine | 1.00 |
| N-methylglucamine | 2.00 |
| Water | 165.00 |
| | 200.00 |

Example 7

| | |
|---|---:|
| Wax blend | 22.00 |
| Fully refined wax 52–54 | 10.00 |
| Diethylenetriamine | 1.00 |
| N-methylglucamine | 2.00 |
| Water | 165.00 |
| | 200.00 |

The hardness of the pastes can be adjusted by way of the appropriate compositions of soft products, such as guerbet acid, guerbet alcohol, fully refined paraffin 52–64 and the hard products such as montan esters, Uniline alcohol. Fine tuning can also be achieved through the plasticizing effect of the humectants, such as sorbitol, N-methylglucamine or diglycerol, for example. To enlarge the temperature range in processing it is also possible to add small fractions of W/O emulsifiers or dispersing auxiliaries such as fatty alcohol EO/PO ether, dioctylsulfosuccinic acid sodium salt, lanolin, beeswax, or resin derivatives.

What is claimed is:

1. A leather care composition comprising a polymer dispersion and a wax blend including 10–80% by weight of an ester component A, 10–80% by weight of an acid component B, and 10–80% by weight of an alcohol component C.

2. The leather care composition as claimed in claim 1, wherein said ester component A consists of partial esters of polyols with carboxylic acids and carboxylic acid mixtures of chain length $C_{16}$–$C_{36}$; partial esters of polyofs with carboxylic acids and carboxylic acid mixtures of chain length $C_{16}$–$C_{36}$, modified with polybasic carboxylic acids of chain length $C_4$–$C_{36}$; partial esters of polyols with carboxylic acids and carboxylic acid mixtures of chain length $C_{16}$–$C_{36}$, modified with aromatic or aliphatic diisocyanates; partial esters of polyols with carboxylic acids and carboxylic acid mixtures of chain length $C_{16-36}$, modified with aromatic or aliphatic carboxylic acids of low molecular mass; or of any desired mixtures of the abovementioned substances, and also, if desired, additionally of natural waxes having an OHN>20.

3. The leather care composition as claimed in claim 2, wherein the number of OH groups in the alcohol component of the partial esters of the ester component A is >=2; wherein 1,2ethanediol and 1,3-butanediol are excepted: and wherein polyhydric primary alcohols, their dimers or oligomers and/or their ethoxylation products may be used.

4. The leather care composition as claimed in claim 2, wherein in the partial esters of the ester component A the degree of esterification is <90%.

5. The leather care composition as claimed in claim 2, wherein in the partial esters of the ester component A the degree of esterification is between 50 and 75%.

6. The leather care composition as claimed in claim 2, wherein for modifying the partial esters of the ester component A with polybasic carboxylic acids use is made of tribasic and dibasic carboxylic acids and wherein for modification with isocyanates use is made of monofunctional and difunctional aromatic and/or aliphatic isocyanates.

7. The leather care composition as claimed in claim 6, wherein citric acid, tartaric acid, malic acid, itaconic acid, maleic acid, adipic acid, sebacic acid, dodecanedioic acid, dimeric fatty acid, phthalic acid and terephthalic acid are used for modifying the partial esters.

8. The leather care composition as claimed in claim 2, wherein for modifying the partial esters of the ester component A with short-chain carboxylic acids use is made of saturated, unsaturated, hydroxy-functional fatty acids, or aromatic carboxylic acids.

9. The leather care composition as claimed in claim 1, wherein said acid component B is selected from the group consisting of montan wax acid, oxidates of long-chain olefins or paraffins, dimerization products of long-chain fatty compounds, mixtures thereof and mixtures of one or more of montan wax acid, oxidates of long-chain olefins or paraffins, dimerization products of long chain fatty compounds with one or more fatty acids.

10. The leather care composition as claimed in claim 1, wherein said alcohol component C is selected from the group of long-chain wax alcohols of chain length >$C_{30}$, guerbet alcohol of chain length >$C_{30}$, wool wax alcohol, stearols, mixtures thereof and one or more of long-chain wax alcohols of chain length >$C_{30}$, guerbet alcohol of chain length >$C_{30}$, wool wax alcohol, and stearols with one or more fatty alcohols.

11. The leather care composition as claimed in claim 1, further comprising hydrocarbon waxes and/or natural waxes.

12. A method for making a leather care composition comprising the step of adding a wax blend comprising 10–80% by weight of an ester component A, 10–80% by weight of an acid component B, and 10–80% by weight of an alcohol component C to a polymer dispersion.

13. The method as claimed in claim 12, wherein said ester component A consists of partial esters of polyols with carboxylic acids and carboxylic acid mixtures of chain length $C_{16}$–$C_{36}$; partial esters of polyols with carboxylic acids and carboxylic acid mixtures of chain length $C_{16-36}$, modified with polybasic carboxylic acids of chain length $C_4$–$C_{36}$; partial esters of polyols with carboxylic acids and carboxylic acid mixtures of chain length $C_{16-36}$, modified with aromatic or aliphatic diisocyanates; partial esters of polyols with carboxylic acids and carboxylic acid mixtures of chain length $C_{16-36}$, modified with aromatic or aliphatic carboxylic acids of low molecular mass; or of any desired mixtures of the abovementioned substances, and also, if desired, additionally of natural waxes having an OHN>20.

14. The method as claimed in claim 12, wherein said acid component B is selected from the group consisting of montan wax acid, oxidates of long-chain olefins or paraffins, dimerization products of long-chain fatty compounds, mixtures thereof and mixtures of one or more of montan wax acid, oxidates of long-chain olefins or paraffins, dimerization products of long chain fatty compounds with one or more fatty acids.

15. The method as claimed in claim 12, wherein said alcohol component C is selected from the group of long-chain wax alcohols of chain length >$C_{30}$, guerbet alcohol of chain length >$C_{30}$, wool wax alcohol, stearols, mixtures thereof and long-chain wax alcohols of chain length >$C_{30}$, guerbet alcohol of chain length >$C_{30}$, wool wax alcohol, and stearols with one or more fatty alcohols.

16. A wax blend comprising 10–80% by weight of an ester component A, 10–80% by weight of an acid component B, and 10–80% by weight of an alcohol component C, wherein said ester component A consists of partial esters of polyols with carboxylic acids and carboxylic acid mixtures of chain length $C_{16}$–$C_{36}$; partial esters of polyols with carboxylic acids and carboxylic acid mixtures of chain length $C_{16}$–$C_{26}$, modified with polybasic carboxylic acids of chain length $C_4$–$C_{36}$; partial esters of polyols with carboxylic acids and carboxylic acid mixtures of chain length $C_{16-36}$, modified with aromatic or aliphatic diisocyanates; partial esters of polyols with carboxylic acids and carboxylic acid mixtures of chain length $C_{16-36}$, modified with aromatic or aliphatic carboxylic acids of low molecular mass; or of any desired mixtures of the abovementioned substances, and also, if desired, additionally of natural waxes having an OHN>20; and wherein said acid component B is selected from the group consisting of montan wax acid, oxidates of long-chain olefins or paraffins, dimerization products of long-chain fatty compounds, mixtures thereof and mixtures of one or more of montan wax acid, oxidates of long-chain olefins or paraffins, dimerization products of long-chain fatty compounds with one or more fatty acids;

wherein said alcohol component C is selected from the group of long-chain wax alcohols of chain length >$C_{30}$, guerbet alcohol of chain length >$C_{30}$, wool wax alcohol, stearols, mixtures thereof and one or more of long-chain wax alcohols of chain length >$C_{30}$, guerbet alcohol of chain length >$C_{30}$, wool wax alcohol, and stearols with one or more fatty alcohols.

17. The wax blend as claimed in claim 16, wherein the number of OH groups in the alcohol component of the partial esters of the ester component A is >=2; wherein 1,2-ethanediol and 1,3-butanediol are excepted; and wherein polyhydric primary alcohols, their dimers or oligomers and/or their ethoxylation products may be used.

18. The wax blend as claimed in claim 16, wherein in the partial esters of the ester component A the degree of esterification is <90%.

19. The wax blend as claimed in claim 16, wherein in the partial esters of the ester component A the degree of esterification is between 50 and 75%.

20. The wax blend as claimed in claim 16, wherein for modifying the partial esters of the ester component A with polybasic carboxylic acids use is made of tribasic and dibasic carboxylic acids and wherein for modification with isocyanates use is made of monofunctional and difunctional aromatic and/or aliphatic isocyanates.

21. The wax blend as claimed in claim 20, wherein citric acid, tartaric acid, malic acid, itaconic acid, maleic acid, adipic acid, sebacic acid, dodecanedioic acid, dimeric fatty acid, phthalic acid and terephthalic acid are used for modifying the partial esters.

22. The wax blend as claimed in claim 16, wherein for modifying the partial esters of the ester component A with short-chain carboxylic acids use is made of saturated, unsaturated, hydroxy-functional fatty acids, or aromatic carboxylic acids.

23. The wax blend as claimed in claim 16, in combination with other wax-like compounds, hydrocarbon waxes and/or natural waxes and/or polymer dispersions and known formulation auxiliaries for preparing aqueous pastes for leather care.

* * * * *